United States Patent [19]

Burhans, Jr. et al.

[11] 4,214,721
[45] Jul. 29, 1980

[54] AIRCRAFT COLLAPSIBLE FUEL TANK

[75] Inventors: Walter R. Burhans, Jr., Miller Place; James L. Ciccarello, Bay Shore; Charles H. Stumpf, Commack, all of N.Y.

[73] Assignee: Grumman Aerospace Corporation, Bethpage, N.Y.

[21] Appl. No.: 896,456

[22] Filed: Apr. 14, 1978

[51] Int. Cl.² .................. B64D 37/04; B64D 37/06
[52] U.S. Cl. ................................. 244/135 B; 220/6; 220/85 B
[58] Field of Search ............ 244/135 R, 135 B, 130, 244/46, 118 R; 220/6, 85 B, 461

[56] References Cited

U.S. PATENT DOCUMENTS

| 2,308,479 | 1/1943 | Young | 220/85 B |
| 2,355,084 | 8/1944 | Kurrle | |
| 2,361,743 | 10/1944 | Butler | |
| 2,373,221 | 4/1945 | Blaylock et al. | |
| 2,552,119 | 5/1951 | Scharenberg | |
| 2,714,999 | 8/1955 | Thieblot et al. | 244/135 R X |
| 2,749,064 | 6/1956 | Kuhlman | 244/130 X |
| 2,777,656 | 1/1957 | Clifton | 244/135 B |
| 3,084,825 | 4/1963 | Hultquist | 220/85 B X |
| 3,101,921 | 8/1963 | Price | 244/135 B |
| 3,114,526 | 12/1963 | Morgan | 244/130 X |
| 3,765,626 | 10/1973 | Maynard et al. | 244/135 R X |

Primary Examiner—Barry L. Kelmachter
Attorney, Agent, or Firm—Mellor A. Gill

[57] ABSTRACT

A collapsible fuel tank for aircraft, the tank having rigid top and bottom elements and foldable rigid side walls containing therein a non-vented fluid-impervious elastomeric bladder. When fluid is pumped into the bladder, it distends to deploy the top, bottom, and side walls whereby a box-like structure whose rigid walls protect the bladder is erected. The withdrawal of fluid from the bladder causes it to contract such that the walls are folded and the tank thereby collapsed into a space-saving volume. The tank can be mounted on the outside surface of an aircraft and the contraction of the tank as fuel is expended effects a reduction of the aircraft frontal area to reduce drag. When used in supersonic polymorphic aircraft, the collapsible tank of this invention allows fuel to be carried in space left vacant when the aircraft is in a slow-flight configuration and the collapse of the tank when the fuel therein is expended permits the volume thus left vacant to be employed when the aircraft is put into its supersonic flight configuration.

3 Claims, 7 Drawing Figures

AIRCRAFT COLLAPSIBLE FUEL TANK

BACKGROUND OF THE INVENTION

1 FIeld Of The Invention

The present invention relates to collapsible fuel tanks for aircraft and, more particularly, to a flexible-bladder type tank having rigid wall structure to protect the bladder from damage.

2 Summary Of The Invention

It is common knowledge that the jet engines which power modern aircraft, particularly of the supersonic type, have an inherent high fuel consumption. Thus, when engine fuel is carried solely in the usual wing or fuselage tanks a penalty is imposed on either the range or endurance of the aircraft. Consequently, resort is commonly had, particularly in military aircraft, to auxiliary external fuel tanks such as wing tip tanks or pod tanks suspended beneath wings or fuselage. However, if these auxiliary tanks are permanently attached, a permanent drag factor is imposed on the aircraft in all conditions of flight. If these tanks are releasable from the aircraft in flight, the drag penalty only exists until the fuel is used and the tank is dropped, but the expenditure of these tanks entails an obvious cost and logistic penalty.

There are conditions in the flight regimen of aircraft, even of the supersonic type, in which drag is not a critical factor; these conditions include landing, takeoff, cruise or loiter and, with VTOL aircraft, hovering flight. Consequently, a drag penalty associated with carrying extra fuel in those conditions of flight is acceptable if the cause of the drag is eliminated when the aircraft undertakes high-speed flight. The fuel tank of this invention is a collapsible tank which distends when it is filled with fuel, but is subsequently contracted into a flat configuration in which it occupies a minimal volume. It is common practice to equip high-speed military aricraft with a load carrier by which weapons, bombs, or stores can be suspended exteriorly of the aircraft, the load carrier having the capability of being rotated to thereby move the load into the load bay in the fuselage. The fuel tank of this invention can be installed on the upper wall of the load bay and, with the carrier positioned with it load outside the fuselage, filled with fuel. Fuel from that tank would be consumed during the takeoff and cruise phases of flight. After the fuel has been used, the contraction of the tank permits the carrier load to be rotated into the fuselage such that the aircraft is "cleaned up" for high sonic or supersonic speeds. It is increasingly common practice also in supersonic aircraft to incorporate a polymorphic construction in which the wings extend straight out from the fuselage for takeoffs and landings and slow speed flight and in which the wings are swept backward for high speeds. In such constructions, a cavity may be provided in each side of the fuselage to accommodate the wing root when the wing is in the swept position. In such design, the fuel tank of this invention can be installed in each of the fuselage cavities. The tanks would be filled, distending them to occupy the cavities, when the wings are in their unswept configuration for takeoffs and landings and lower speed flight. Consuming the fuel would cause the tanks to contract such that the fuselage volume would be free for sweeping the wings for high speed flight.

Not only does the tank of this invention have value in locations in the inside volume of the wings and fuselage, but the tank can be installed near any suitable surface of the aircraft. One major rigid wall of the tank would be shaped to form a normal minimum drag design contour of a portion of the exterior surface of the aircraft. Filling the tank with fuel would move this rigid wall outwardly into the airstream moving past the aircraft. In this condition, the tank adds parasitic drag to the aircraft. However, the fuel from the tank would be consumed during the initial stages of flight such that the contraction of the tank would restore the aircraft into its normal low-drag configuration for high-speed flight.

DESCRIPTION OF THE PRIOR ART

Collapsible fuel tanks per se are, of course, known in the prior art. One such construction is shown by E. M. Scharenberg (U.S. Pat. No. 2,552,119). The design of Scharenberg comprises a framework that is erected to form a streamlined structure which is subsequently covered with a fuel-retaining bladder. Inasmuch as the tank when erected maintains a rigid streamlined shape whether filled or emptied of fuel it does not offer the capabilities of the instant invention whose geometry is varied as a function of the amount of fuel in the tank. There is a teaching by J. R. Clifton (U.S. Pat. No. 2,777,656) of a collapsible fuel tank which distends when full of fuel and contracts to a flat configuration when empty. Clifton discloses merely a rubber tank expanded by fuel. Not having structural reinforcement, the tank lacks the ability to withstand airloads and flight-maneuvering loads. In addition, the tank would be vulnerable to handling damage and other hazards in service since the rubber outer surface is completely unprotected. A further teaching in the prior art of a collapsible fuel tank is the design disclosed by M. A. Price (U.S. Pat. No. 3,101,921). Price, however, discloses an exteriorly suspended pod arrangement having a rigid boat-shaped center body from which a pair of cylindrical fuel bladders are hung in a saddlebag-like configuration. Price utilizes a series of expansible and contractable straps or slings to take the loads imposed on the bladders. He discloses a pair of clamshell doors for shielding the bladders in their empty stowed position, but the bladders are largely unprotected when they are full. Price thus does not disclose a collapsible fuel tank having a fuel bladder contained within rigid folding walls such that the fuel bladder is protected thereby in all stages of filling but which is foldable into a minimum volume, substantially flat cnfiguration when the bladder is empty.

OBJECTS OF THE INVENTIONS

To remedy the deficiencies of the prior art, it is therefore a principal object of the invention to provide a variable-geometry fuel tank that is damage resistant and which can resist structural loads whether it is full or empty or in intermediate conditions of filling.

It is another object of the invention to provide a fuel tank for aircraft which folds automatically from a maximum volume erected state when full of fuel to a substantially flat minimum volume state when it is emptied such that extra fuel can be carried in space in the aircraft which is vacant in certain flight regimes but is occupied by some aircraft component or other equipment in other flight regimes.

A further object of the invention is to provide a fuel tank that is roughly proportional in size to the amount of fuel it contains at any specific time.

Yet another object of the invention is to provide a fuel tank which can be mounted on an outside surface of an aircraft, the drag of the tank being a factor of the amount of fuel it contains such that, although the tank presents maximum parasitic drag in the initial stages of flight when drag is least critical, as the fuel is consumed the tank contracts to "clean up" the aircraft to a low drag configuration suitable for high speed flight.

DESCRIPTION OF THE DRAWINGS

For the purpose of illustrating the invention, there are shown in the drawings the forms which are presently preferred, it should be understood, however, that the invention is not necessarily limited to the precise arrangements and instrumentalities here shown.

Referring now to the drawings, FIG. 1 illustrates a collapsible fuel tank 10 of the invention mounted on structure which can be the skin 12 of a vehicle such as an aircraft or the like. Fuel tank 10 comprises a flexible fuel-proof bladder 14 (see FIG. 2) mounted inside a collapsible box 16 having hinged walls. The box has a bottom element or wall 18; a top element or wall 20; end wall 22 and, distal therefrom, end wall 24 (not shown); and side wall 26 and, distal therefrom, side wall 28 (not shown). Each of the side and end walls is of a double panel construction provided with hinging means at the adjoining longitudinal edges of the panels and at their longitudinal edges adjoining the top and bottom so that the walls can be folded relative to one another such that the box can be collapsed upon itself. Thus, as perhaps best shown in FIG. 3, side wall 26, for example, will have upper and lower panels, 30 and 32 respectively, with hinging means, preferably a suitable piano-type hinge 34, at the adjoining longitudinal edges 36 and 38 respectively of panels 30 and 32. Hinging means, such as piano-type hinges 40 and 42 respectively are provided at upper longitudinal edge 44 of upper panel 30 adjoining edge 46 of the top 20 and at the lower longitudinal edge 48 of lower panel 32 adjoining edge 50 of the bottom 18. The orientation of the hinges are such that, when fuel is withdrawn from the tank, which is shown in its substantially full, erected condition in FIG. 3, the hingèd edges 36 and 38 of panels 30 and 32 will travel inward automatically with respect to the center of the box to fold the walls and collapse the box into the empty, folded condition shown in FIG. 2. If required, the walls of each of the panels can have a triangular portion 39 cut away to facilitate folding. It will be understood that the other side wall 28 and end walls 22 and 24 will be of a similar construction and will have a similar hinging action as side wall 26.

Figure 1:
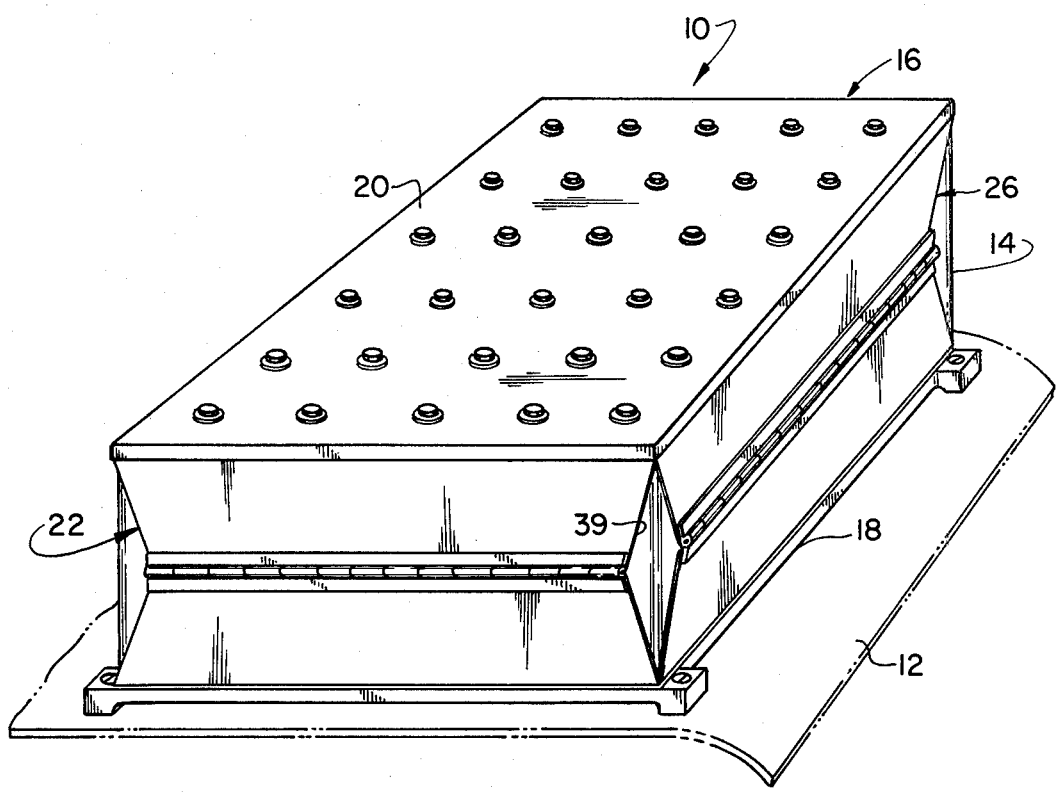
FIG. 1 is a perspective view of one presently preferred embodiment of the fuel tank of the invention.

It will be appreciated that the designation bottom, top, end, or side, and the like, as applied to walls or other components is merely for the convenience of exposition because the tank can be mounted with an orientation such that other positional designations would apply. In addition, although a tank of a rectangular shape is illustrated, it will be recognized that tanks of other configurations such as, for example, square, pentagonal, hexagonal, and the like also are within the scope of the invention.

The walls of the box can be fabricated out of any suitable lightweight strong material such as an aluminum or magnesium alloy, metal honeycomb, or a composite strengthened with fiberglas and the like. Any suitable fuel proof elastomeric material such as a synthetic rubber, which can be reinforced with fabric, can be used for the bladder 14. Mechanical fasteners 52 and/or a suitable bonding agent 54 are used to fasten the bladder securely to the inside walls of the box. Any suitable fastening system such as bolts 56 and nuts 57 can be used to secure the fuel tank to structure 12 in a well-understood manner.

Collapsible fuel tank 10 is not vented and is connected to the fuel system of the vehicle through suitable means, fuel line 11, in the wall of the tank adjacent the skin 12 of the vehicle.

Figure 2:
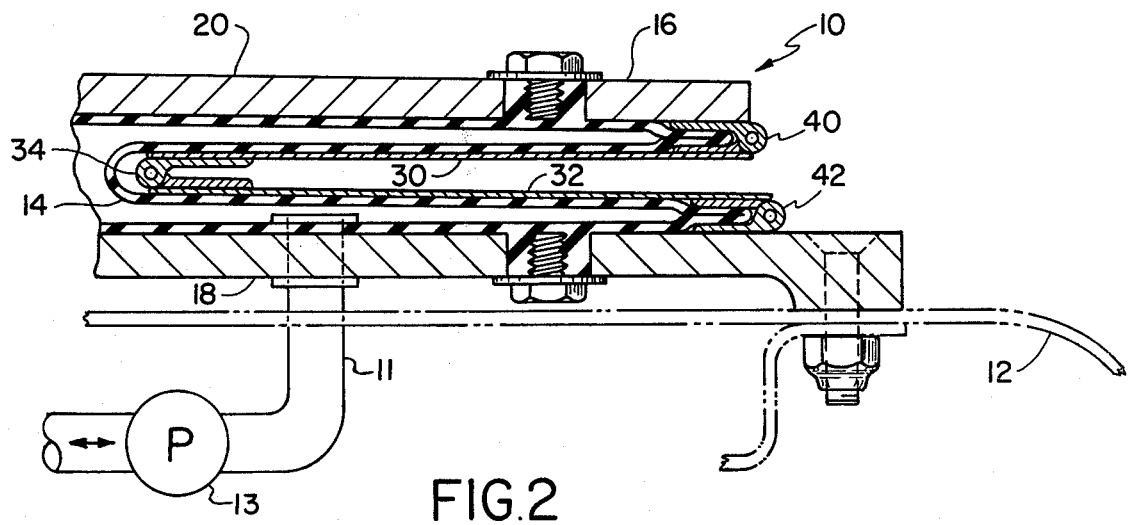
FIG. 2 is a fragmentary cross-sectional view of the fuel tank of FIG. 1 showing the tank in the empty, folded condition.
Figure 3:
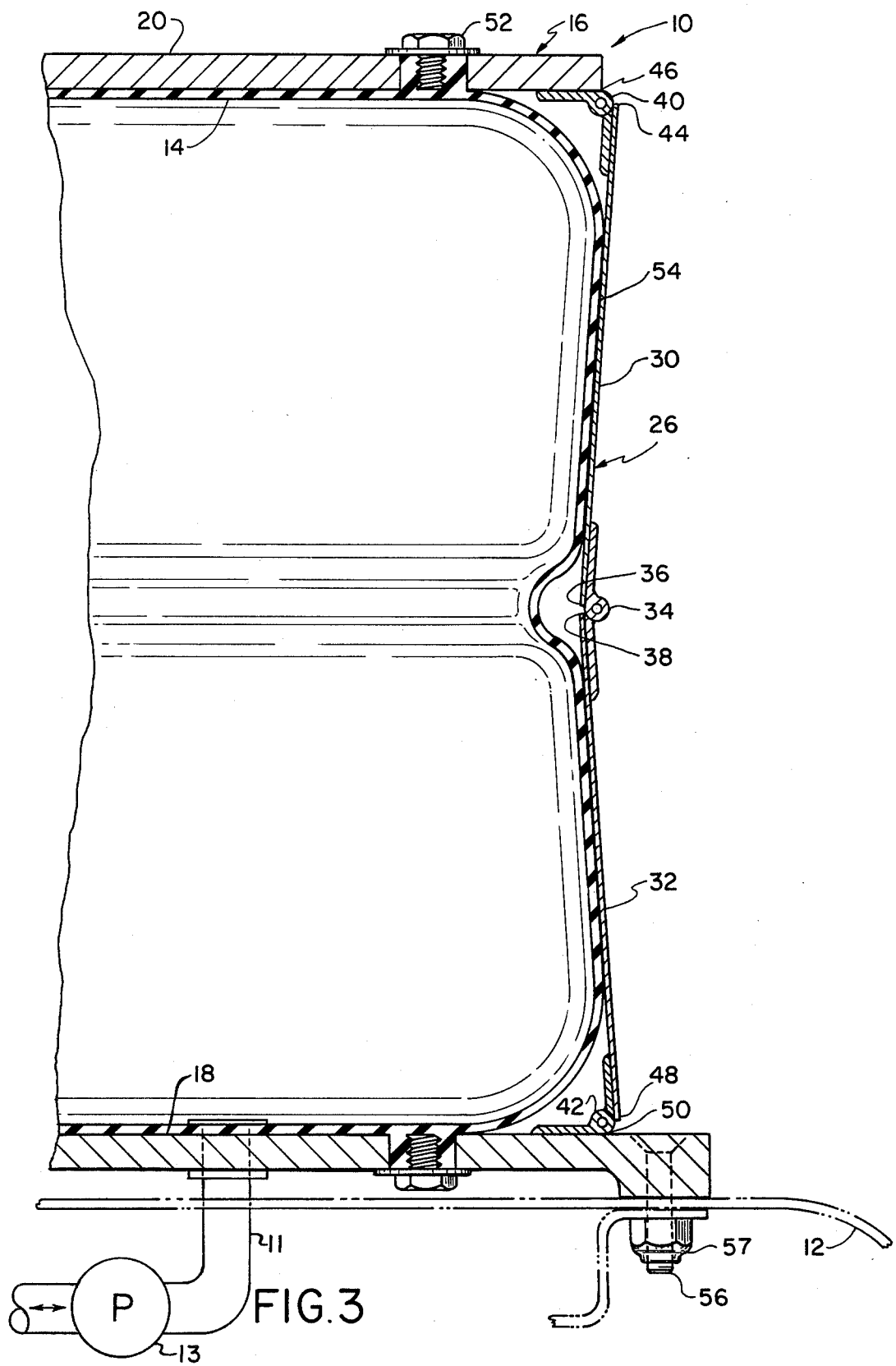
FIG. 3 is a fragmentary cross-sectional view of the fuel tank of FIG. 1 showing the tank in the substantially full, erected condition.

In operation, fuel is pumped by pump 13 into the tank 10, distending the bladder 14 such that the walls attached thereto are deployed to thereby unfold the box 16. Fuel can be pumped into the tank until it is substantially full and the box is unfolded to its maximum extent (see FIGS. 1 and 3), or pumping can be terminated at some intermediate state of filling. As fuel from the tank is pumped by pump 13 out and used, the bladder will contract progressively, causing the walls of the box to fold accordingly. When the tank is emptied completely of fuel, pump suction will collapse the tank into its fully folded configuration (FIG. 2).

Figure 4:
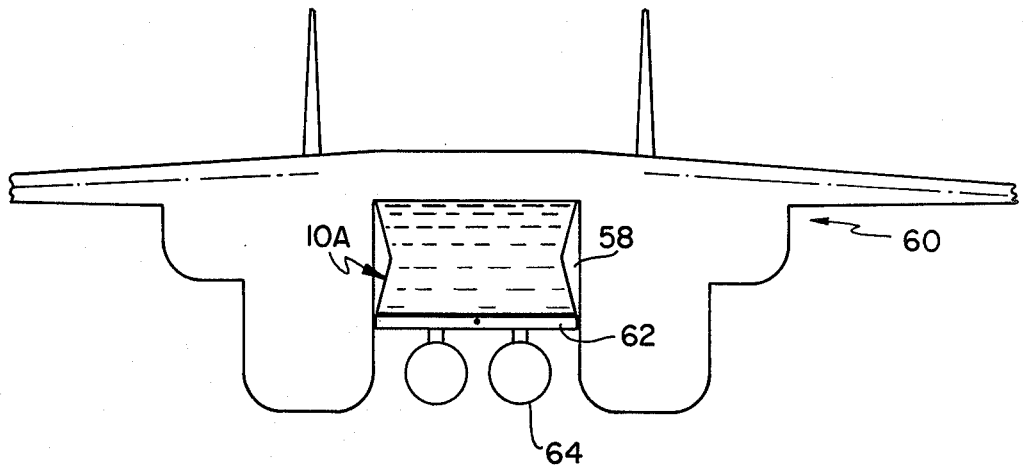
FIG. 4 is a diagrammatical representation of a fuel tank of the invention installed in the weapons bay of an aircraft, the tank being full.
Figure 5:
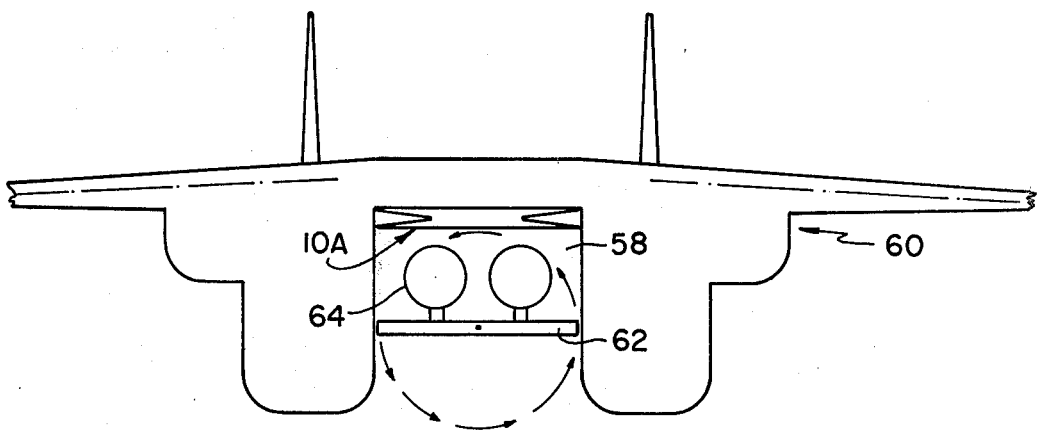
FIG. 5 is a diagrammatical representation of the fuel tank of FIG. 4, the tank being empty.

A fuel tank having the variable geometry of the tank of this invention has many advantages for aircraft use. Thus, a fuel tank 10A can be mounted within the bomb bay cavity 58 of a supersonic attack aircraft 60. Prior to a mission, the weapons carrier rack 62 of the aircraft is rotated such that the weapons, which may be bombs 64, are positioned externally of the bomb bay cavity. Fuel tank 10A is then pumped full of fuel, as shown in FIG. 4. In operation on a mission, fuel from tank 10A is used first for takeoff, initial climb-out, and outbound subsonic cruise toward the target area. When the fuel in the tank is expended such that the tank is folded into its collapsed empty configuration, sufficient space is thus made available in the bomb bay cavity 58 to permit the weapons carrier rack 62 to be rotated to bring the bombs into the cavity. The aircraft is thus restored into its normal minimum-drag configuration for supersonic flight to the target area (FIG. 5).

Figure 6:
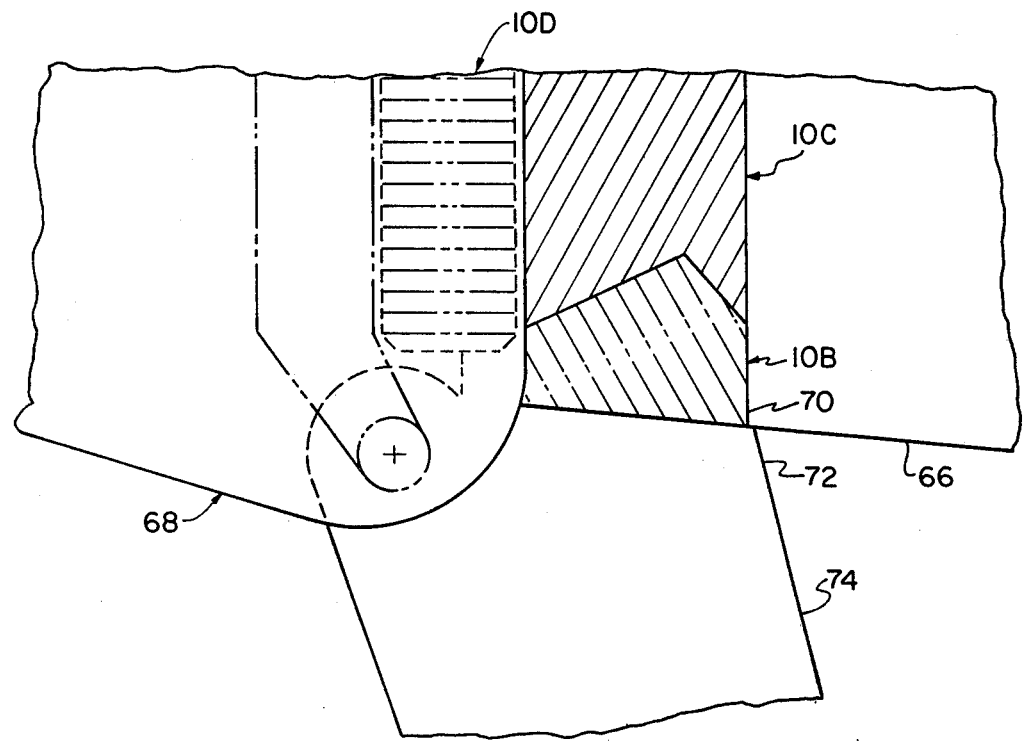
FIG. 6 is a diagrammatical representation of fuel tanks of the invention installed in the wing sweep cavity of an aircraft.

In polymorphic supersonic aircraft of the variable-sweep wing type, the variable geometry fuel tanks of the invention can be installed in the fuselage volume of the aircraft that is occupied by the wings in the supersonic flight swept configuration. As shown in FIG. 6, one or more collapsible tanks 10B, 10C, and 10D can be installed in the fuselage 66 of an aircraft 68 in the volume 70 into which the root 72 of the aircraft wing 74 is housed when the wing is in its swept position. In operation, prior to a flight and when the wings are swept forward in their configuration for subsonic flight and for takeoffs and landings, the tanks are pumped full of fuel such that the distended tanks substantially fill the wing housing volume 70. In operation on a flight, fuel from tank 10B is consumed first for takeoff and initial climb-out and subsonic flight which are accomplished with the wings in the swept forward configuration. When sufficient fuel is expended such that the fuel bladder contracts to collapse tank 10B, adequate space will be available in fuselage volume 70 to accommodate wing root 72 should flight conditions dictate a limited sweeping of the wings. Fuel would then be used from tank 10C permitting a greater sweeping of the wings, and expending the fuel from tank 10D will free the fuselage volume for a full sweeping of the wings.

Figure 7:
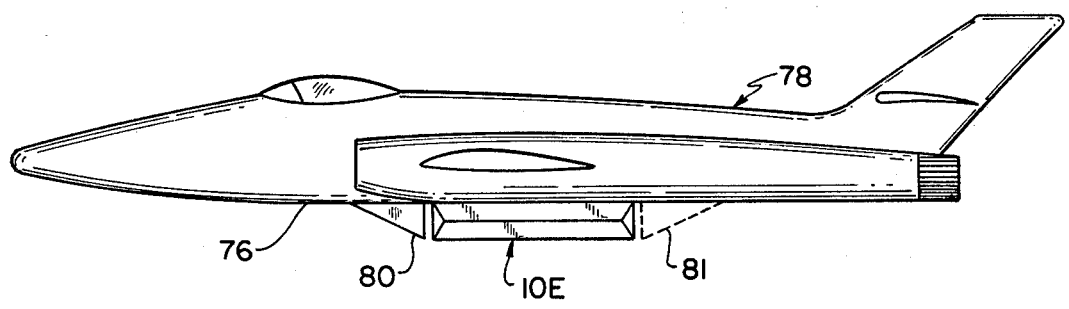
FIG. 7 is a side elevation of the fuel tank of the invention installed on the exterior surface of an aircraft.

The fuel tank of this invention can also be mounted on an outside surface of an aircraft. As shown in FIG. 7, the tank 10E can be fixedly mounted on the bottom of the fuselage 76 of an aircraft 78 to provide additional fuel to extend the range and endurance. A retractable visor 80 can be provided for added protection for the tank and to reduce aerodynamic drag. It will be understood that the tank will contract progressively as fuel therefrom is expended and visor 80 can be retracted accordingly by well-known suitable means (not shown). Should the requirements dictate, the tank can be further faired by a retractable visor 81 installed at the after end of the tank.

Although shown and described in what are believed to be the most practical and preferred embodiments, it is apparent that departures from the specific method and apparatus described will suggest themselves to those skilled in the art and may be made without departing from the spirit and scope of the invention. We, therefore, do not wish to restrict ourselves to the particular constructions illustrated and described, but desire to avail ourselves of all modifications that may fall within the scope of the appended claims.

Having thus described our invention, what we claim is:

1. In an aircraft whose configuration results in interior space thereof being substantially fully occupied in a first condition by only a fuel tank containing fuel, which space is occupied by equipment such as ancillary aircraft components, weapons, and stores in a second condition when said tank is emptied of fuel, a collapsible fuel tank immovably mounted on a surface defining said space, said tank comprising:

an articulated enclosure structure having a rigid top element and a rigid bottom element spaced with respect to one another, said structure having a plurality of walls between said top and bottom elements, each of said walls comprising a rigid upper panel and a rigid lower panel with hinge means connecting the adjoining edges of said upper and said lower panels, hinge means connecting the upper edge of each of said upper panels with the associated peripheral region of said top element substantially at the edge thereof and hinge means connecting the lower edge of each of said lower panels with the associated peripheral region of said bottom element substantially at the edge thereof;

a non-vented, fuel-impervious elastomeric bladder housed in said enclosure structure and protected thereby, the outer wall of said bladder being fastened to the inside surface of said top and bottom elements and said panels, said hinged top and bottom elements and walls forming an erected substantially closed box structure when said bladder is filled with fuel, with said hinge means permitting said panels to be folded with respect to said top and bottom elements as fuel is withdrawn from said bladder;

mounting means for fixedly fastening said enclosure structure to aircraft structure;

means for pumping fuel into said bladder such that the distension thereof deploys at least said top element and said wall panels whereby in said first condition said enclosure structure is erected to thereby occupy said interior space; and means for extracting fuel from said bladder such that said extraction of fuel causes the contraction of said bladder whereby said walls are folded and said tank is collapsed in said second condition to vacate said interior space such that it can be occupied by said equipment.

2. The aircraft of claim 1 wherein the interior space is a load bay.

3. The aircraft of claim 1 wherein said aircraft is of a polymorphic, variable swept-wing type and wherein the interior space are cavities occupied by the wing roots in the swept position of the wings.

* * * * *